United States Patent
Bialer et al.

(10) Patent No.: US 11,846,701 B1
(45) Date of Patent: Dec. 19, 2023

(54) LONG SIGNAL INTEGRATION OF MULTIPLE VELOCITY HYPOTHESES

(71) Applicant: GM GLOBAL TECHNOLOGY OPERATIONS LLC, Detroit, MI (US)

(72) Inventors: Oded Bialer, Petah Tivak (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 340 days.

(21) Appl. No.: 17/194,676

(22) Filed: Mar. 8, 2021

(51) Int. Cl.
G01S 13/58 (2006.01)
G01S 13/931 (2020.01)
G01S 7/292 (2006.01)

(52) U.S. Cl.
CPC ............ *G01S 13/584* (2013.01); *G01S 7/292* (2013.01); *G01S 13/582* (2013.01); *G01S 13/931* (2013.01); *G01S 2013/93271* (2020.01)

(58) Field of Classification Search
CPC ...... G01S 13/584; G01S 7/292; G01S 13/582; G01S 13/931; G01S 2013/93271
See application file for complete search history.

(56) References Cited

U.S. PATENT DOCUMENTS

| | | | |
|---|---|---|---|
| 2019/0064319 A1* | 2/2019 | Bialer | G01S 13/931 |
| 2019/0137601 A1* | 5/2019 | Driscoll | G01S 13/931 |
| 2019/0265347 A1* | 8/2019 | Wintermantel | H01Q 1/3283 |
| 2019/0391250 A1* | 12/2019 | Cohen | G01S 13/87 |
| 2021/0080558 A1* | 3/2021 | Gosala | G01S 13/589 |
| 2021/0215816 A1* | 7/2021 | Xu | G01S 13/32 |

* cited by examiner

Primary Examiner — Donald H B Braswell
(74) Attorney, Agent, or Firm — CANTOR COLBURN LLP

(57) ABSTRACT

A vehicle, system, and method of determining a velocity of an object. The system includes a radar system and a processor. The radar system is configured to obtain a radar signal with respect to the object over an integration interval, the radar signal including a plurality of velocity samples. The processor is configured to partition the integration interval into a plurality of time segments, each time segment including a subset of the velocity samples, perform a first integration of the subset of the velocity samples within a selected time segment using a first set of velocity of hypotheses to obtain a first stage integration value for the time segment, perform a second integration using the first stage integration value using a second set of velocity hypotheses to obtain a second stage integration value over the integration interval, and determine the velocity of the object from the second stage integration value.

15 Claims, 7 Drawing Sheets

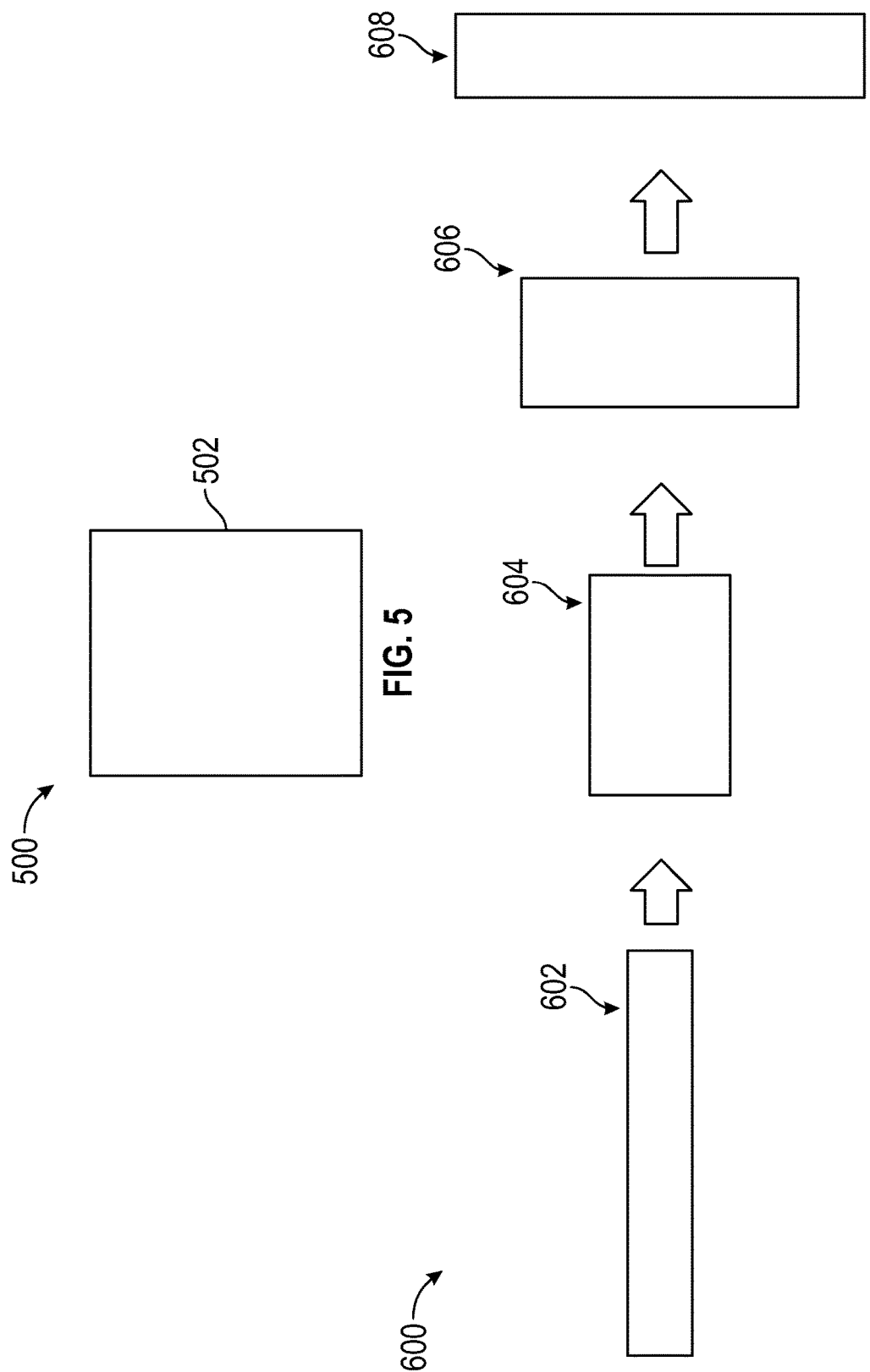

LONG SIGNAL INTEGRATION OF MULTIPLE VELOCITY HYPOTHESES

INTRODUCTION

The subject disclosure relates to radar systems and methods for determining a velocity of object and, more specifically, to systems and methods for increasing a signal-to-noise ratio of a signal obtained over an integration interval of the radar system in which velocity migration is significant.

A radar system used at a vehicle can transmit a source signal into an environment of the vehicle and receive a reflection of the source signal from an object in the environment. The source signal and the reflection signal can then be compared to each other to determine a velocity of the object relative to the vehicle. The reflection signal is sampled over a time interval known as an integration interval and a transform is performed in order to produce a frequency distribution in frequency space, the frequency space having a grid defining a plurality of velocity hypotheses. The velocity of the vehicle can be determined by finding the location of a peak of the frequency distribution in frequency space. When an object moves in space and/or changes its velocity during the integration interval, the peak of the frequency distribution is broadened, reducing the resolution of the velocity. The resolution can be increased by sampling the reflection signal over a long integration interval to increase the number of radar samples. However, increasing the duration of the integration interval increase the amount of processing required and the computation time. Accordingly, it is desirable to provide a method for determining a velocity of the object that reduces the computational complexity inherent in long integration intervals.

SUMMARY

In one exemplary embodiment, a method of determining a velocity of an object is disclosed. A radar signal is obtained with respect to the object over an integration interval. The radar signal includes a plurality of velocity samples. The integration interval is partitioned into a plurality of time segments. Each time segment includes a subset of the velocity samples. A first integration of the subset of the velocity samples is performed within a selected time segment using a first set of velocity of hypotheses to obtain a first stage integration value for the selected time segment. A second integration is performed using the first stage integration value using a second set of velocity hypotheses to obtain a second stage integration value over the integration interval. The velocity of the object is determined from the second stage integration value.

In addition to one or more of the features described herein, a first resolution of the first set of velocity hypotheses is less than a second resolution of the second set of velocity hypotheses and a number of the velocity samples that are used as input to the first integration is greater than a number of first integration values that are used as input to the second integration. The first stage integration value is obtained by performing the first integration over a product of the velocity samples within the selected time segment and a first phase term corresponding to a velocity hypothesis selected from the first set of velocity hypotheses. The second stage integration value is obtained by performing the second integration over a product of the first stage integration value and a second phase term corresponding to the second set of velocity hypothesis. Performing the second integration includes determining an interpolation function for the first stage integration value and performing a coherent integration of a product of the interpolation function with the second phase term. Performing the first integration includes obtaining the first stage integration value for the plurality of time segments and each of the first set of velocity hypotheses. The vehicle is navigated with respect to the object based on the velocity of the object.

In another exemplary embodiment, a system for determining a velocity of an object is disclosed. The system includes a radar system and a processor. The radar system is configured to obtain a radar signal with respect to the object over an integration interval, the radar signal including a plurality of velocity samples. The processor is configured to partition the integration interval into a plurality of time segments, each time segment including a subset of the velocity samples, perform a first integration of the subset of the velocity samples within a selected time segment using a first set of velocity of hypotheses to obtain a first stage integration value for the time segment, perform a second integration using the first stage integration value using a second set of velocity hypotheses to obtain a second stage integration value over the integration interval, and determine a velocity of the object from the second stage integration value.

In addition to one or more of the features described herein, a first resolution of the first set of velocity hypotheses is less than a second resolution of the second set of velocity hypotheses and a number of the velocity samples that are used as input to the first integration is greater than a number of first stage integration values that are used as input the second integration. The processor is further configured to perform the first integration over a product of the velocity samples within the selected time segment and a first phase term corresponding to a velocity hypothesis selected from the first set of velocity of hypotheses. The processor is further configured to perform the second integration over a product of the first stage integration value and a second phase term corresponding to the second set of velocity hypothesis. The processor is further configured to perform the second integration by determining an interpolation function for the first stage integration value and performing a coherent integration of a product of the interpolation function with the second phase term. The processor is further configured to obtain the first stage integration value for each of the plurality of time segments and each of the first set of velocity hypotheses. The processor is further configured to navigate the vehicle with respect to the object based on the velocity of the object.

In yet another exemplary embodiment, a vehicle is disclosed. The vehicle includes a radar system and a processor. The radar system is configured to obtain a radar signal from an object over an integration interval, the radar signal including a plurality of velocity samples. The processor is configured to partition the integration interval into a plurality of time segments, each time segment including a subset of the velocity samples, perform a first integration of the subset of the velocity samples within a selected time segment using a first set of velocity of hypotheses to obtain a first stage integration value for the time segment, perform a second integration using the first stage integration value using a second set of velocity hypotheses to obtain a second stage integration value over the integration interval, and determine a velocity of the object from the second stage integration value.

In addition to one or more of the features described herein, a first resolution of the first set of velocity hypotheses is less than a second resolution of the second set of velocity hypotheses and a number of the velocity samples that are used as input to the first integration is greater than a number of first stage velocity values that are used as input to the second integration stage. The processor is further configured to perform the first integration over a product of the velocity samples within the selected time segment and a first phase term corresponding to a velocity hypothesis selected from the first set of velocity of hypotheses. The processor is further configured to perform the second integration over a product of the first stage integration value and a second phase term corresponding to the second set of velocity hypothesis. The processor is further configured to perform the second integration by determining an interpolation function for the first stage integration value and performing a coherent integration of a product of the interpolation function with the second phase term. The processor is further configured to obtain the first stage integration value for each of the plurality of time segments and each of the first set of velocity hypotheses.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 shows a diagram illustrating the complexity of a conventional single stage integration process using a time interval without time segmentation or hierarchal integration stages;

FIG. 6 shows a diagram illustrating the complexity of each stage of a multiple stage integration process disclosed herein;

DETAILED DESCRIPTION

Figure 1:
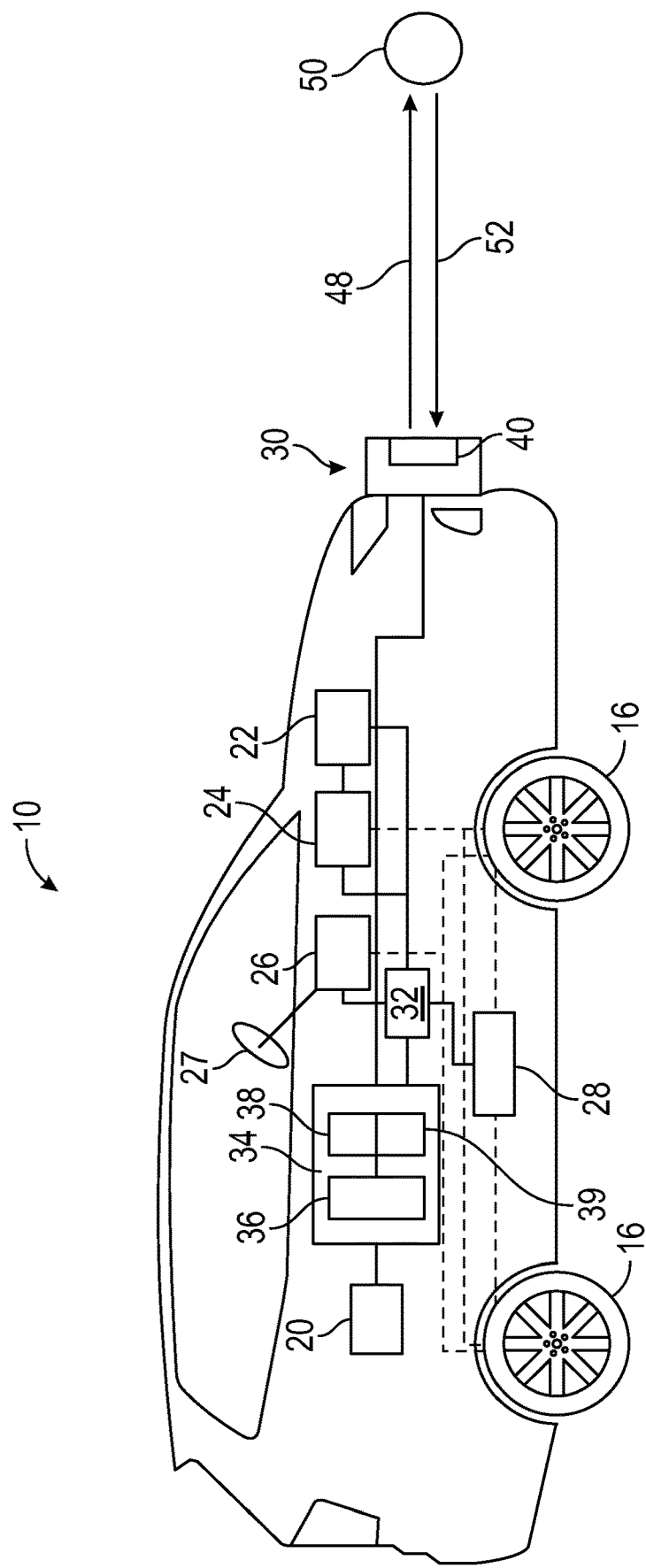
FIG. 1 shows an autonomous vehicle in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and determines various parameters of the objects useful in locating the position and relative velocities of various remote vehicles in the environment of the autonomous vehicle. Such parameters can be provided to the controller 34. In operation, the radar system 40 transmits a radio frequency (RF) reference signal 48 that is reflected by one or more objects 50 in the field of view of the autonomous vehicle 10 as one or more reflected echo signals or reflected signals 52, which are received back at the radar system 40. The one or more reflected signals 52 can be used to determine various parameters of the one or more objects 50, such as a range of the object, Doppler frequency or relative radial velocity of the object, and azimuth, etc. The sensor system 30 includes additional sensors, such as digital cameras, for identifying road features, etc.

The controller 34 includes a processor 36 and a computer readable storage device or storage medium 38. The storage medium 38 includes programs or instructions 39 that, when executed by the processor 36, operate the autonomous vehicle 10 based on output from the sensor system 30. The controller 34 can build a trajectory for the autonomous vehicle 10 based on the output of sensor system 30 and provide the trajectory to the actuator system 32 to control the propulsion system 22, transmission system 24, steering system 26, and/or brake system 28 in order to navigate the autonomous vehicle 10 with respect to the one or more objects 50 based on a parameter of the one or more objects 50, such as velocity, range, etc.

Figure 2:
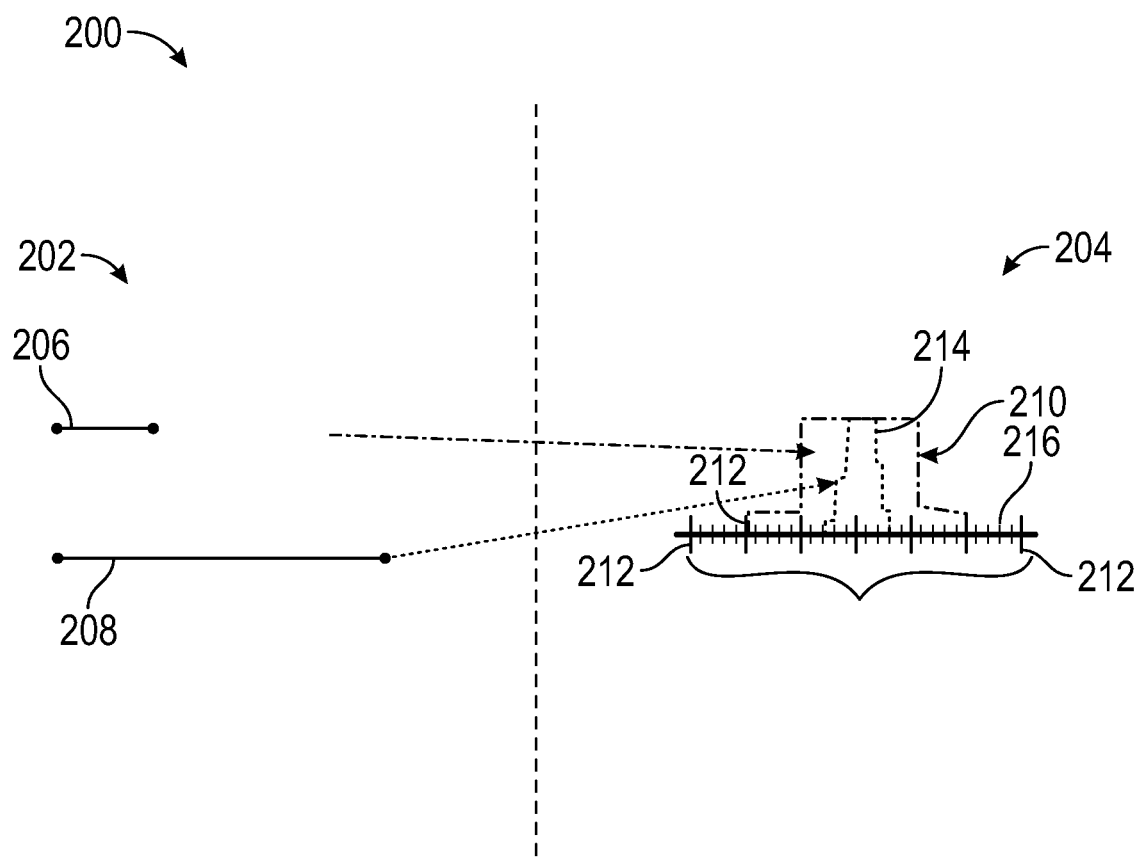
FIG. 2 shows a schematic diagram illustrating the effects of a duration of an integration interval on a velocity resolution.

FIG. 2 shows a schematic diagram 200 of illustrating the effects of a duration of an integration interval on a velocity resolution. A short integration interval 206 for the radar signal and a long integration interval 208 for the radar signal are both shown in the time domain 202. A Fast Fourier Transform (FFT) is performed over the integration intervals to generate frequency distributions in frequency space. The Fourier transform is performed on the short integration interval 206 to generate a first frequency distribution having a first peak 210 in the frequency domain 204. Performing the Fourier transform on the short integration interval 206 results in a first frequency grid having first grid marks 212, with each of the first grid marks providing a first set of velocity hypotheses that can be used in a computation process to determine a location of the first peak 210. The first grid marks 212 are indicated by the large grid marks in FIG. 2. The location of the first peak 210 is related to a velocity of the object but can also be used to determine a range of the object, in various embodiments.

The Fourier transform is performed on the long integration interval 208 to generate a second peak 214 in the frequency domain 204. Performing the Fourier transform on the long integration interval 208 generates a second frequency grid having second grid marks 216. The second grid marks 216 include both the large grid marks and the small grid marks. Each of the second grid marks 216 provides a second set of velocity hypotheses that can be used in a computation process to determine a location of the second peak 214. A first resolution of the first peak 210 is less than the second resolution of the second peak 214. Therefore, the resolution of velocity determined from the first peak 210 is less than the resolution f velocity determined from the second peak 214.

As shown in FIG. 2, the number of first grid marks 212 is less than the number of second grid marks 216. In various embodiments, the first set of first grid marks 212 is a proper subset of the second set of second grid marks 216. In the illustrative example of FIG. 2, every fifth grid mark from the second set is also a grid mark in the first set. Thus, the second frequency grid has five times the number of velocity hypotheses than the first frequency grid, allowing for greater resolution of the resulting peak by the second frequency grid. This is evident as shown by the second peak 214 being narrower than the first peak 210.

Figure 3:
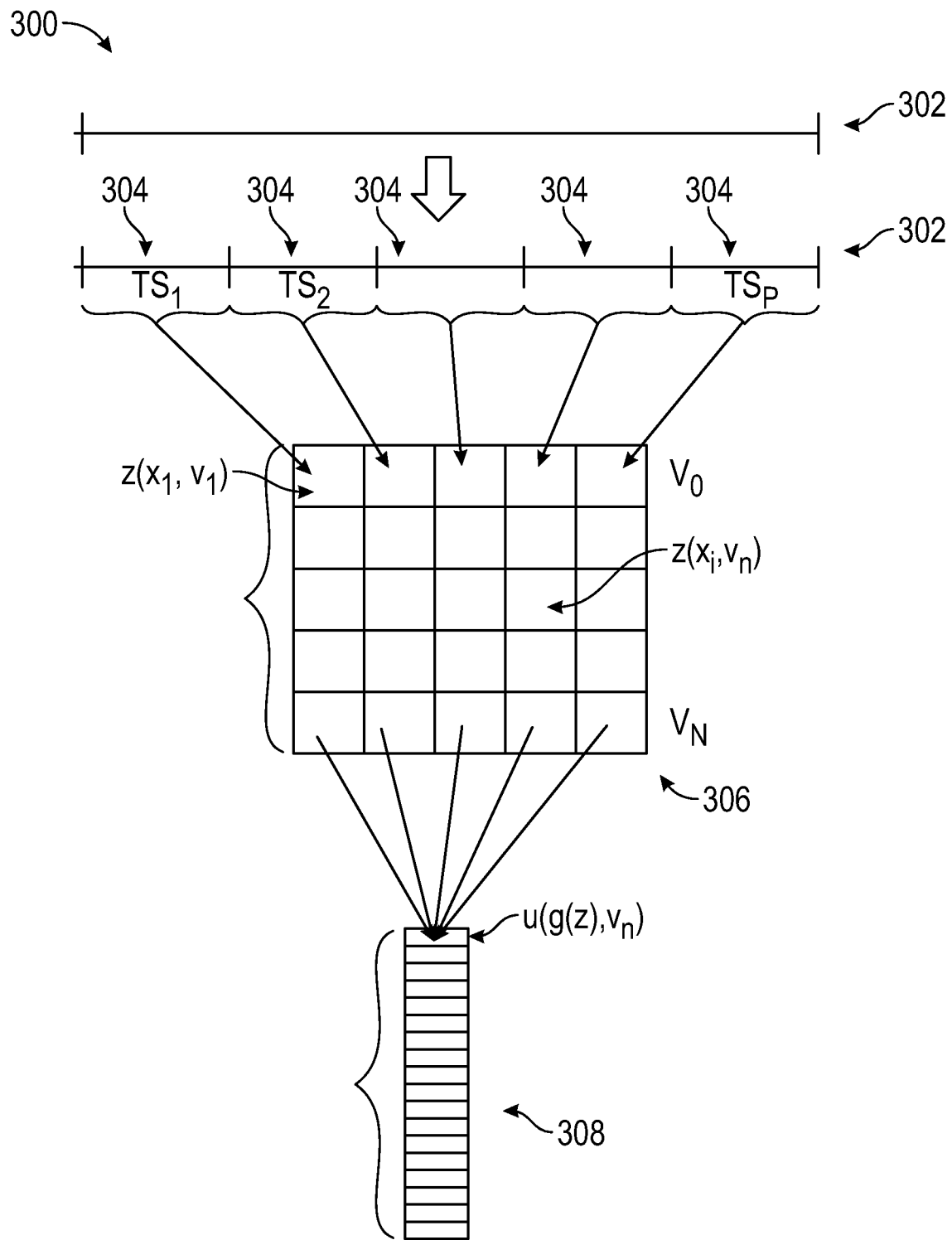
FIG. 3 schematically illustrates a signal integration process that is suitable for determining a velocity of an object from a radar signal, in an embodiment.

FIG. 3 schematically illustrates a signal integration process 300 that is suitable for determining a velocity of an object from a radar signal, in an embodiment. The signal integration process involves a series of integration stages in which input or samples to an integration stage are integrated with velocity hypotheses. At each successive integration stage, the resolution of the velocity hypotheses is increased while the number of input samples is reduced. The signal integration process 300 involves partitioning an integration interval into a plurality of time segments, performing, in a first integration stage, a low resolution integration over each of the time segments using the velocity hypotheses corresponding to the short duration time segments, and performing, in a second integration stage, a high resolution integration using the results of the first integration stage and the velocity hypotheses corresponding to the long duration interval. For long integration intervals, the signal integration process provides a high velocity resolution while reducing the computational complexity.

The signal integration process 300 begins with a long integration interval 302. The number of samples obtained over the long integration interval 302 is N. In a pre-processing stage, the long integration interval 302 is partitioned into a P time segments 304, labelled as $TS_1$, $TS_2$, ..., $TS_P$ in FIG. 3. Each time segment 304 is equal in duration and includes at least one sample from the long integration interval 302. The number of samples in each time segment is given by $N_1 = N/P$. As an example, the long integration interval 302 can include 30 samples and can be partitioned into 5 time segments 304 having 6 samples each.

A first integration stage is represented by a grid 306 in which a plurality of first stage integration values z is determined for each of the time segments 304. The first stage integration value z is produced by an integration of the samples within a selected time segment and a velocity hypothesis selected from a set of low-resolution velocity hypotheses (i.e., the first set of velocity hypotheses). For P time segments and Q hypotheses, the number of first stage integration values is P*Q. As shown schematically, the first stage integration generates P*Q blocks, which are arranged in a grid 306 with a length of the grid indicating the number of time segments and a width of the grid indicating the number of velocity hypotheses. Each block in the grid represents a first stage integration value obtained by a coherent integration over a product of the velocity samples within one of the time segments and a phase term corresponding to one of the velocity hypotheses. A velocity hypothesis includes a velocity term v and its related terms, such as an acceleration term V (i.e., a first derivative of the velocity with respect to time) and a jerk term V (i.e., a second derivative of the velocity with respect to time). In one embodiment, the first stage integration value for a selected a block is given by Eq. (1):

$$z^i(v, \dot{v}, \ddot{v}) = \sum_{n=1}^{N_1} x_{n+(i-1)N_1} \exp\left[\frac{j4\pi}{\lambda}\left(vnT + \frac{1}{2}\dot{v}(nT)^2 + \frac{1}{6}\ddot{v}(nT)^3\right)\right] \quad \text{Eq. (1)}$$

where i is an index indicating the ill' time segment of the integration interval, $N_1$ is the number of samples per time segment and n is an index over the samples of the time segment. The parameter T is the duration of the time segment and $\lambda$ is the frequency of the source signal. The term is $x_{n+(i-1)N_1}$ is the $n^{th}$ sample within the $i^{th}$ time segment and $z^i(v, \dot{v}, \ddot{v})$ is the first stage integration value for the $i^{th}$ time segment and a particular velocity hypothesis $(v, \dot{v}, \ddot{v})$.

A second integration stage is represented by grid 308. In the second integration stage, an integration is performed using a product of the first stage integration values z and a phase term corresponding to a high-resolution set of velocity hypotheses (i.e., the second set of velocity hypothesis). Since the second set of velocity hypotheses has a higher resolution than the first set of velocity hypotheses, this second stage integration generates a higher resolution for the frequency peak. The second integration stage includes a coherent integration process to generate a second stage integration value u using Eq. (2):

$$u^k(v, \dot{v}, \ddot{v}) = \sum_{n=1}^{N_2} g\big(z^{n+(k-1)N_2}(v, \dot{v}, \ddot{v})\big) \quad \text{Eq. (2)}$$

$$\exp\left[\frac{j4\pi}{\lambda}\left(vnTN_1 + \frac{1}{2}\dot{v}(nTN_1)^2 + \frac{1}{6}\ddot{v}(nTN_1)^3\right)\right]$$

where $N_2$ is the number of time segments and g $(z^{n+(k-1)N_2}(v, \dot{v}, \ddot{v}))$ an interpolation function with respect to a selected first integration stage value. The interpolation function can be determined by using a nearest neighbor value or an interpolated value for $(z^{n+(k-1)N_2}(v, \dot{v}, \ddot{v}))$.

Figure 4:
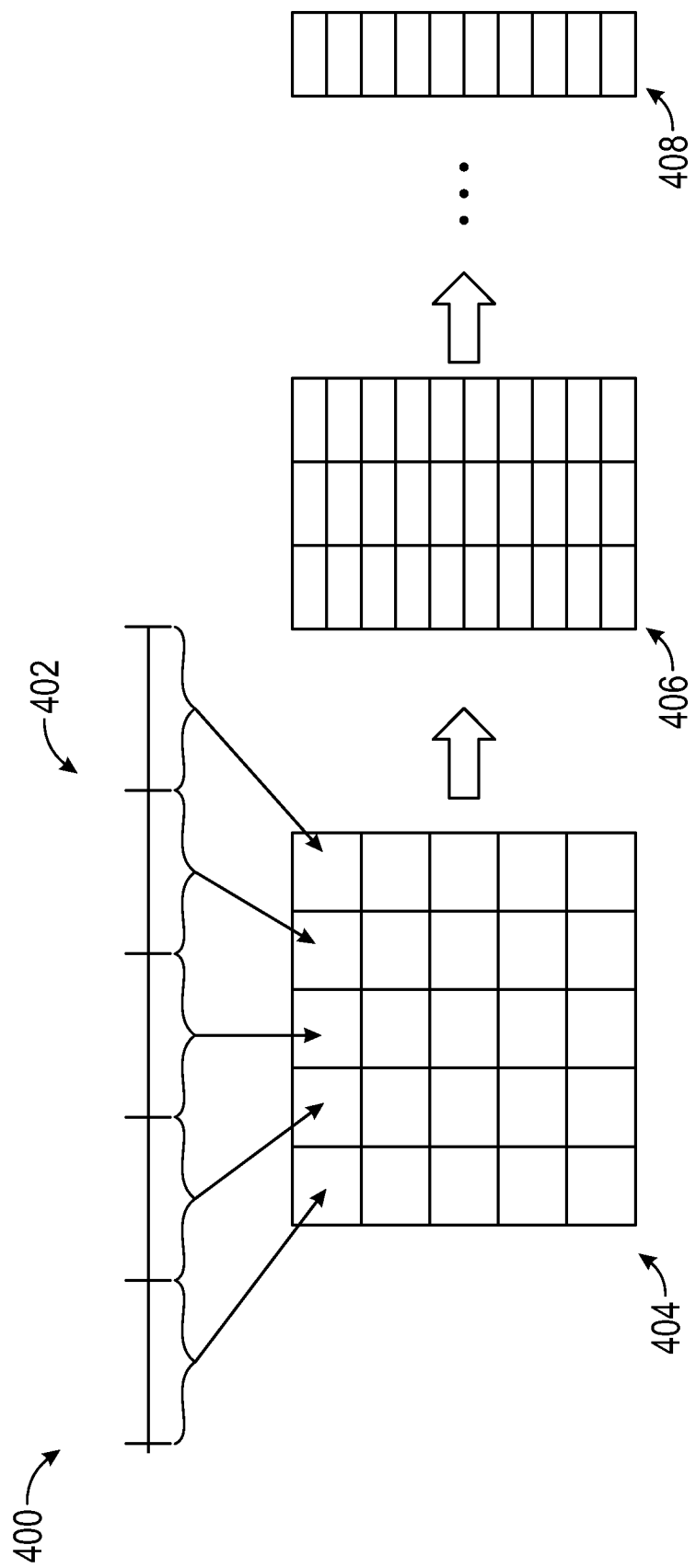
FIG. 4 shows a diagram illustrating the hierarchical stages of the signal processing method disclosed herein.

FIG. 4 shows a diagram 400 illustrating the hierarchical stages of the signal processing method disclosed herein. As illustrated in FIG. 4, the signal processing method can include more than two integration stages. The results of multiple integrations are shown. First integration stage 404 is illustrated as a 5×5 grid of blocks. The number of columns for the grid is equal to P (i.e., the number of time segments in integration interval 402) and the number of rows proportional to N/P (i.e., the number of samples in each time segment). The number of velocity hypotheses for the second integration stage 406 is greater than the number of velocity hypotheses for the first integration stage 404, while the number of inputs to the second integration stage 406 is less than the number inputs to the first integration stage 404. The number of velocity hypotheses for the third integration stage 408 is greater than the number of velocity hypotheses for second integration stage 406, while the number of inputs to the third integration stage 408 is less than the number of inputs to the second integration stage 406. For each successive stage, the number of velocity hypotheses increases while the number of inputs from the previous integration stage decreases.

FIG. 5 shows a diagram 500 illustrating the complexity of a conventional single stage integration process using a time interval without time segmentation or hierarchal integration stages. Rectangle 502 represents the complexity of the conventional process. The complexity of this processing operation is on the order of N^2, where N is the number of samples in the long integration interval.

FIG. 6 shows a diagram 600 illustrating the complexity of each stage of a multiple stage integration process disclosed herein. The complexity of each integration stage is illustrated by an area of a rectangle. The complexity of a stage refers to an amount of computational processing that needs to be performed at the stage. The length of each rectangle represents the number of inputs and the width of each rectangle represents the number of velocity hypotheses used in the corresponding stage. As shown in FIG. 6, the complexity of the first stage (represented by area of the rectangle 602) is about the same as the complexity of the second stage (represented by the area of rectangle 604). Similarly, the complexity of the third stage (represented by area of the rectangle 606) is about the same as the complexity of the second stage (area of rectangle 604). Also, the complexity of the fourth stage (represented by the area of rectangle 608) is about the same as the complexity of the third stage (area of rectangle 606). A fourth stage has about a same complexity (area of rectangle 608) also has comparable complexity. The general sameness of the complexity is due to the number of inputs decreasing at each stage while the number of velocity hypotheses increases at each stage.

Comparing the area of rectangle 502 from FIG. 5 to an area of the sum of rectangles 602, 604, 606 and 608, the complexity of the process disclosed herein is less than that required by conventional processing. Specifically, the complexity of the first integration stage 602 shown in FIG. 6 is on the order of N*Q where N is the number of samples in the long integration interval and Q is the number of samples in the time segments of the first integration stage. The complexity of the second integration stage 604 is on the order of N*P, where P is the number of input samples to the second integration stage. For a two-stage integration process, the complexity of the process is therefore on the order of N*(P+Q). Thus, the complexity for the two-stage integration process is reduced by a factor of P from the complexity of the conventional processing, which is N*N.

Figure 7:
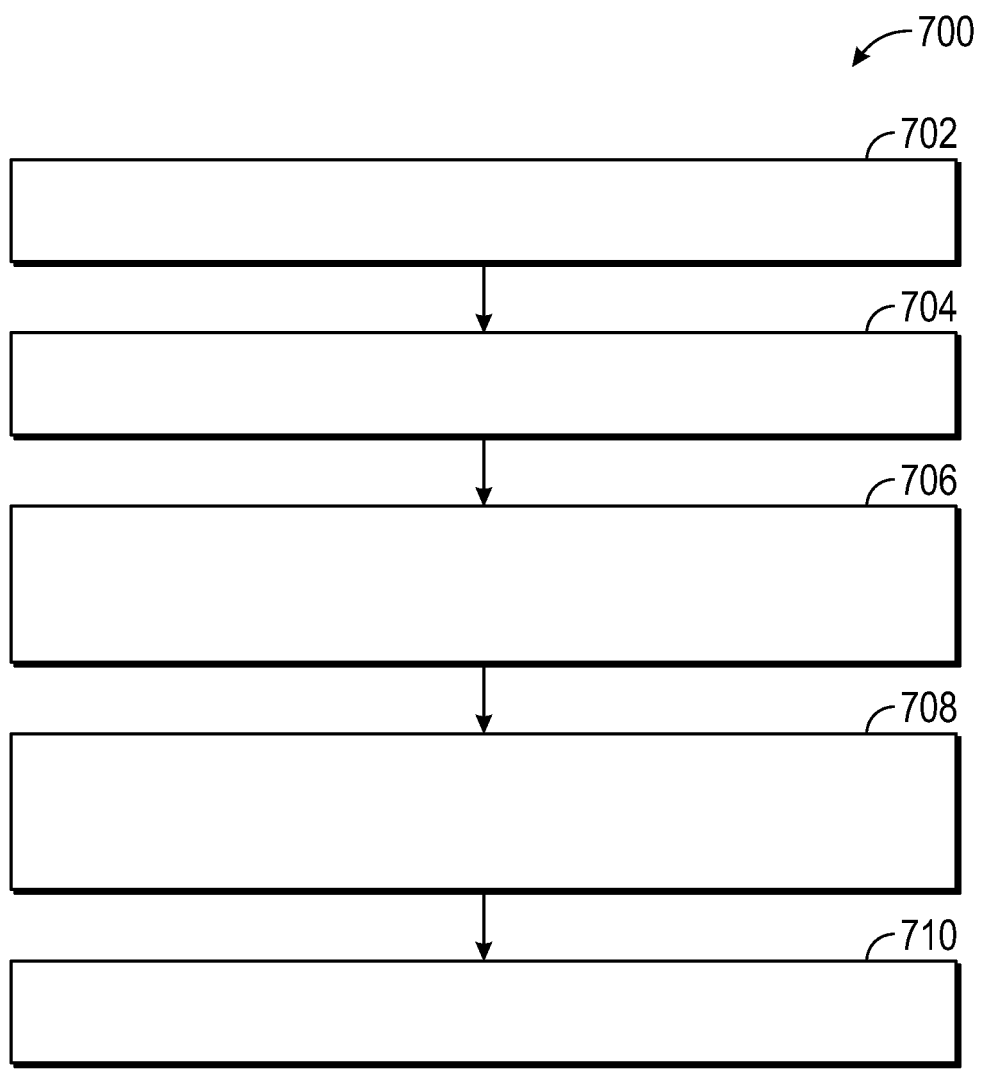
FIG. 7 shows a flowchart of the signal integration process disclosed herein.

FIG. 7 shows a flowchart 700 of the signal integration process disclosed herein. In box 702, a radar signal or reflection signal is received at a radar system sampling over a first integration interval. In box 704, the first integration interval is partitioned into a plurality of second time intervals. In box 706, a first coherent integration is performed over the short time intervals using a low-resolution set of velocity hypotheses, thereby obtaining a first stage integration value. In box 708, a second coherent integration is performed over the first stage integration values using a high-resolution set of velocity hypotheses to obtain a second stage integration value. In box 710, the velocity of the object is determined using the second stage integration value.

Figure 8:
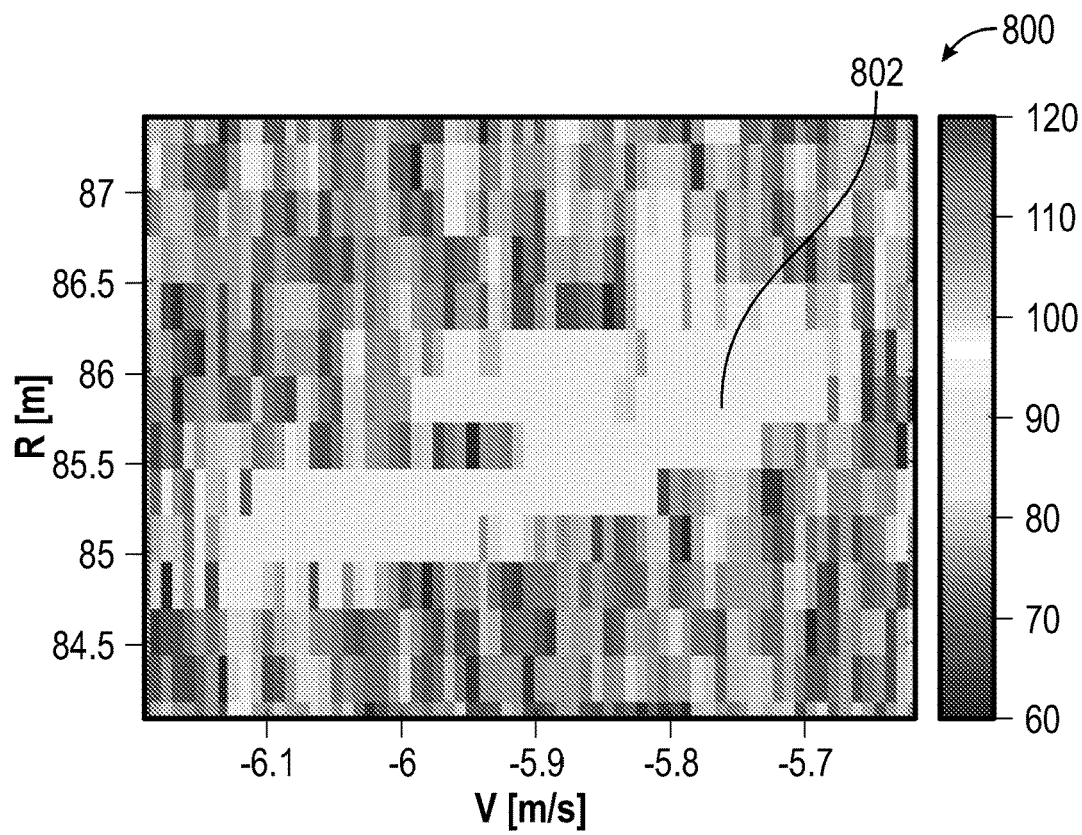
FIG. 8 shows a range-Doppler graph obtained from an object approaching the autonomous vehicle.

FIG. 8 shows a range-Doppler graph 800 obtained from an object approaching the autonomous vehicle 10. A radar system is operated using a long duration integration interval of about 200 microseconds (msec) using conventional processing. Due to the motion of the object, the target's range and velocity migrate during the integration interval. As a result, the peak frequency 802 in the range-Doppler graph 800 is relatively broad and undefined, and the signal-to-noise ratio is low. This leads to a low-resolution value of the velocity.

Figure 9:
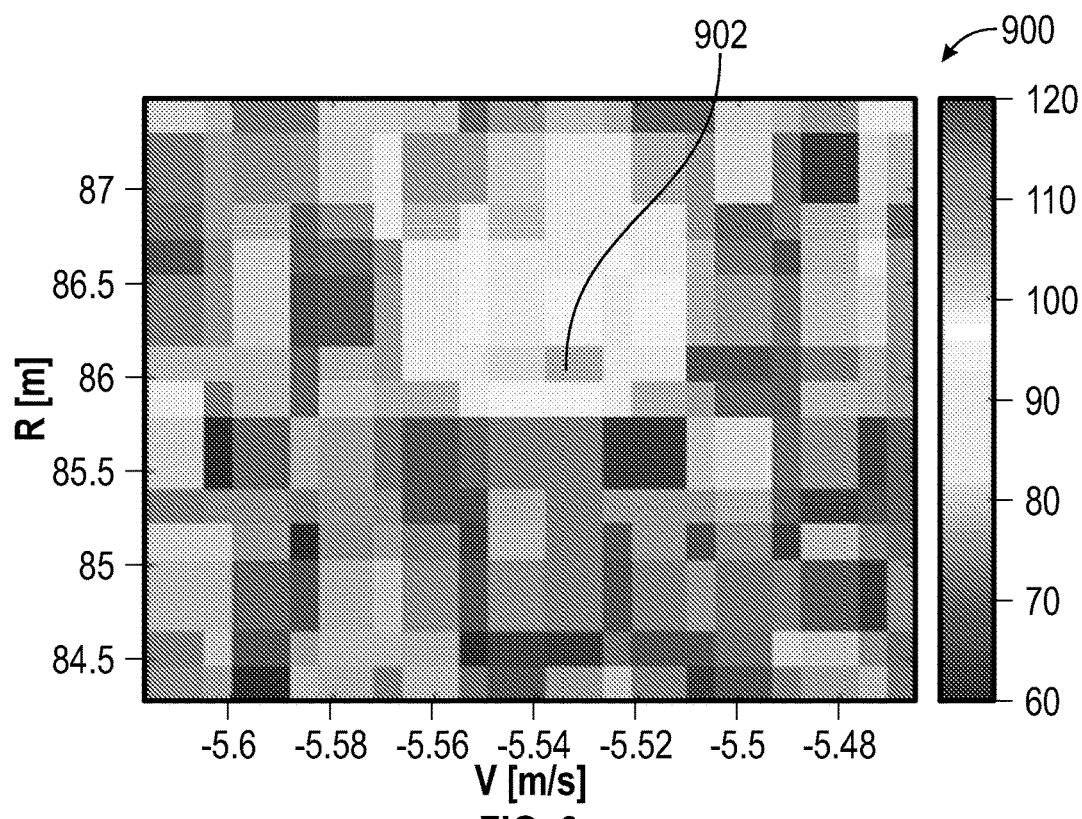
FIG. 9 shows a range-Doppler graph obtained of the object using a long duration integration interval and the processing method disclosed herein.

FIG. 9 shows a range-Doppler graph 900 obtained of the object using a long duration integration interval and the processing method disclosed herein. Although there is target motion within the long duration integration interval, the peak frequency 902 is well-defined and has a high signal-to-noise ratio. This allows for higher resolution value for the velocity of the object.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of determining a velocity of an object, comprising:
    obtaining a radar signal with respect to the object over an integration interval, the radar signal including a plurality of velocity samples;
    partitioning the integration interval into a plurality of time segments, each time segment including a subset of the velocity samples;
    performing a first integration over a product of the subset of the velocity samples within a selected time segment and a first phase term corresponding to a velocity hypothesis selected from a first set of velocity of hypotheses to obtain a first stage integration value for the selected time segment;
    performing a second integration using the first stage integration value using a second set of velocity hypotheses to obtain a second stage integration value over the integration interval;
    determining the velocity of the object from the second stage integration value; and
    navigating a vehicle with respect to the object based on the velocity of the object.

2. The method of claim 1, wherein a first resolution of the first set of velocity hypotheses is less than a second resolution of the second set of velocity hypotheses and a number of the velocity samples that are used as input to the first integration is greater than a number of first integration values that are used as input to the second integration.

3. The method of claim 1, wherein the second stage integration value is obtained by performing the second integration over a product of the first stage integration value and a second phase term corresponding to the second set of velocity hypothesis.

4. The method of claim 3, wherein performing the second integration further comprises determining an interpolation function for the first stage integration value and performing a coherent integration of a product of the interpolation function with the second phase term.

5. The method of claim 1, wherein performing the first integration further comprises obtaining the first stage integration value for the plurality of time segments and each of the first set of velocity hypotheses.

6. A system for determining a velocity of an object, comprising:
 a radar system configured to obtain a radar signal with respect to the object over an integration interval, the radar signal including a plurality of velocity samples; and
 a processor configured to:
  partition the integration interval into a plurality of time segments, each time segment including a subset of the velocity samples;
  perform a first integration over a product of the subset of the velocity samples within a selected time segment and a first phase term corresponding to a velocity hypothesis selected from a first set of velocity of hypotheses to obtain a first stage integration value for the time segment;
  perform a second integration using the first stage integration value using a second set of velocity hypotheses to obtain a second stage integration value over the integration interval;
  determine the velocity of the object from the second stage integration value.

7. The system of claim 6, wherein a first resolution of the first set of velocity hypotheses is less than a second resolution of the second set of velocity hypotheses and a number of the velocity samples that are used as input to the first integration is greater than a number of first stage integration values that are used as input the second integration.

8. The system of claim 6, wherein the processor is further configured to perform the second integration over a product of the first stage integration value and a second phase term corresponding to the second set of velocity hypothesis.

9. The system of claim 8, wherein the processor is further configured to perform the second integration by determining an interpolation function for the first stage integration value and performing a coherent integration of a product of the interpolation function with the second phase term.

10. The system of claim 6, wherein the processor is further configured to obtain the first stage integration value for each of the plurality of time segments and each of the first set of velocity hypotheses.

11. A vehicle, comprising:
 a radar system configured to obtain a radar signal from an object over an integration interval, the radar signal including a plurality of velocity samples; and
 a processor configured to:
  partition the integration interval into a plurality of time segments, each time segment including a subset of the velocity samples;
  perform a first integration over a product of the subset of the velocity samples within a selected time segment and a first phase term corresponding to a velocity hypothesis selected from a first set of velocity of hypotheses to obtain a first stage integration value for the time segment;
  perform a second integration using the first stage integration value using a second set of velocity hypotheses to obtain a second stage integration value over the integration interval;
  determine a velocity of the object from the second stage integration value; and
  navigate the vehicle with respect to the object based on the velocity of the object.

12. The vehicle of claim 11, wherein a first resolution of the first set of velocity hypotheses is less than a second resolution of the second set of velocity hypotheses and a number of the velocity samples that are used as input to the first integration is greater than a number of first stage velocity values that are used as input to the second integration stage.

13. The vehicle of claim 11, wherein the processor is further configured to perform the second integration over a product of the first stage integration value and a second phase term corresponding to the second set of velocity hypothesis.

14. The vehicle of claim 13, the processor is further configured to perform the second integration by determining an interpolation function for the first stage integration value and performing a coherent integration of a product of the interpolation function with the second phase term.

15. The vehicle of claim 11, wherein the processor is further configured to obtain the first stage integration value for each of the plurality of time segments and each of the first set of velocity hypotheses.

\* \* \* \* \*